Nov. 4, 1924.
R. B. KERNOHAN ET AL
1,513,828
STRUCTURE AND METHOD OF OPERATION OF HEATING FURNACES
Filed Jan. 10, 1922 4 Sheets-Sheet 1
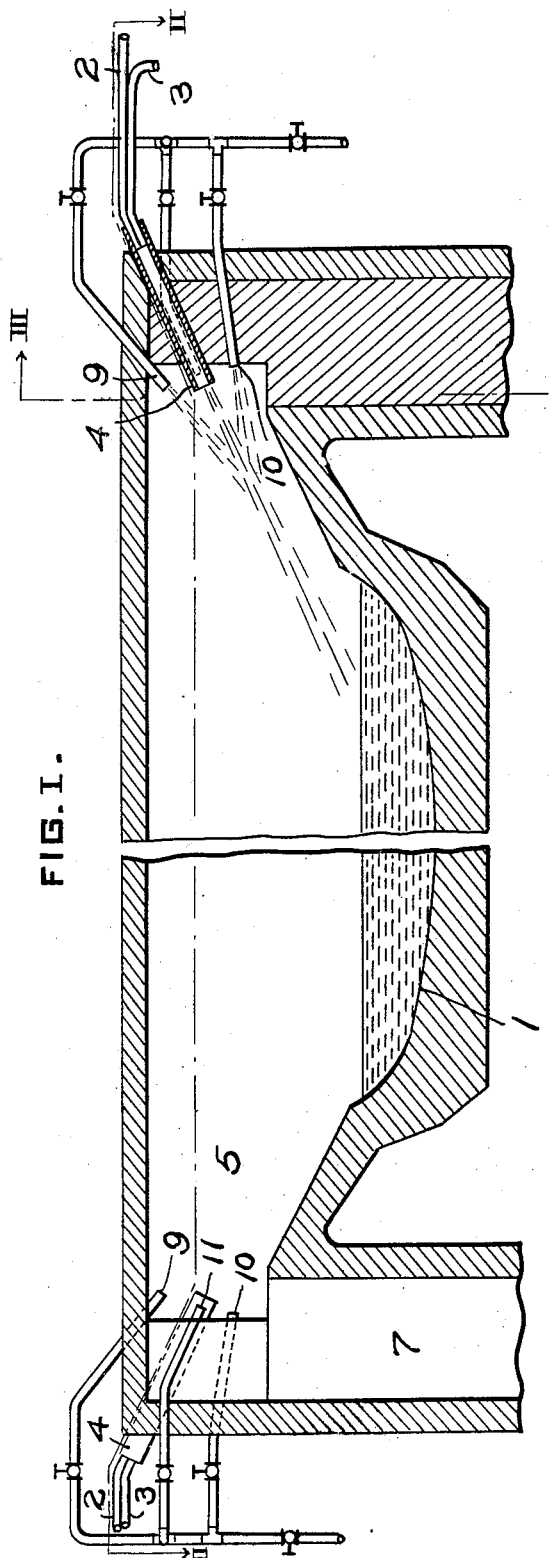
FIG. I.
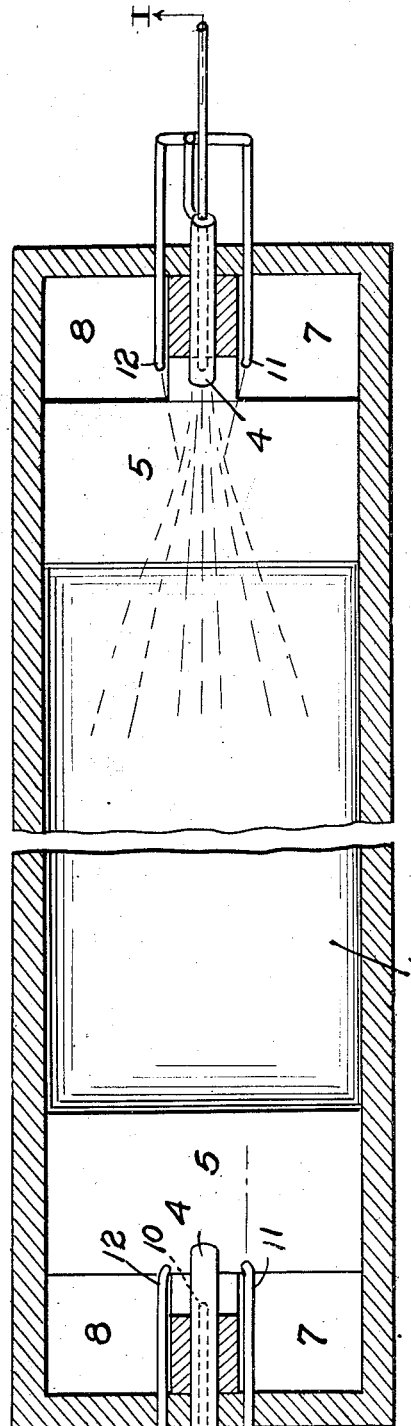
FIG. II.
WITNESSES
INVENTORS
Robert B. Kernohan
James S. Lochhead
Willibald Trinks
by Christy and Christy
their attorneys

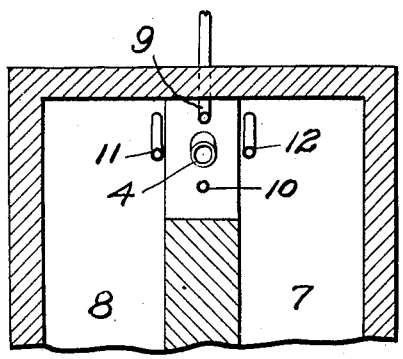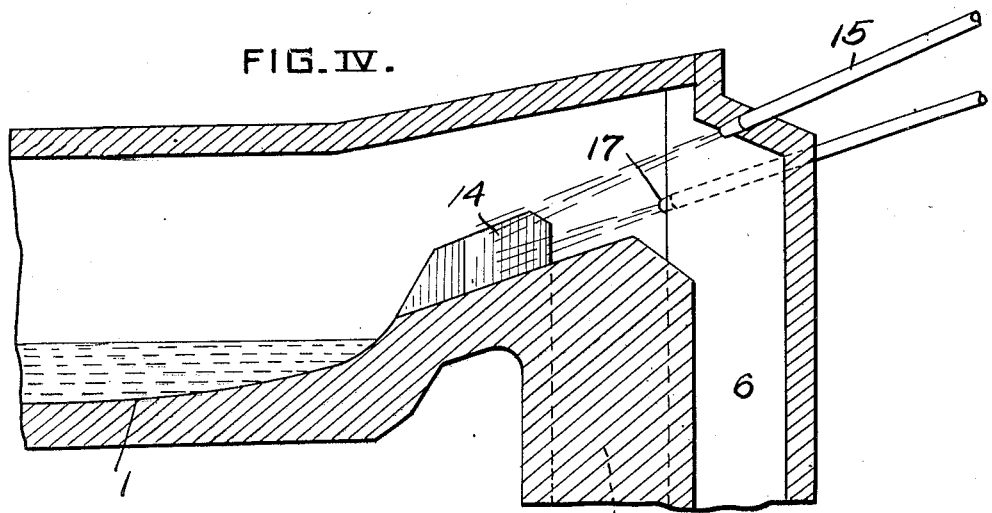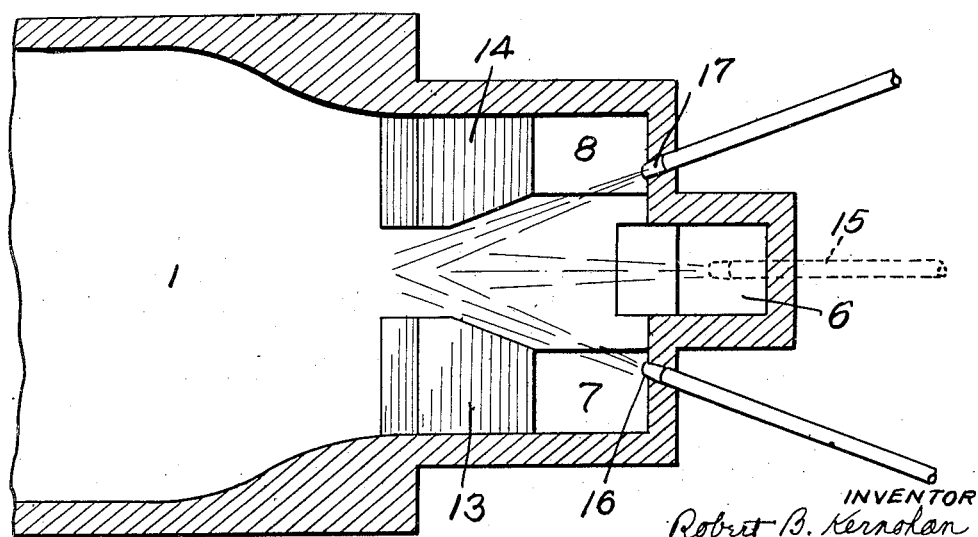

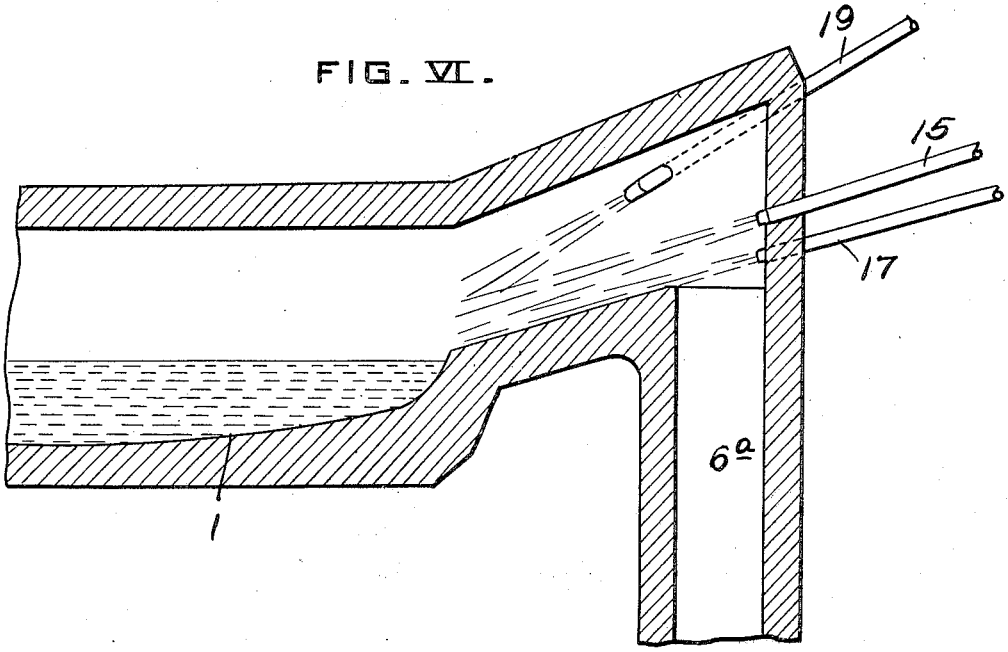
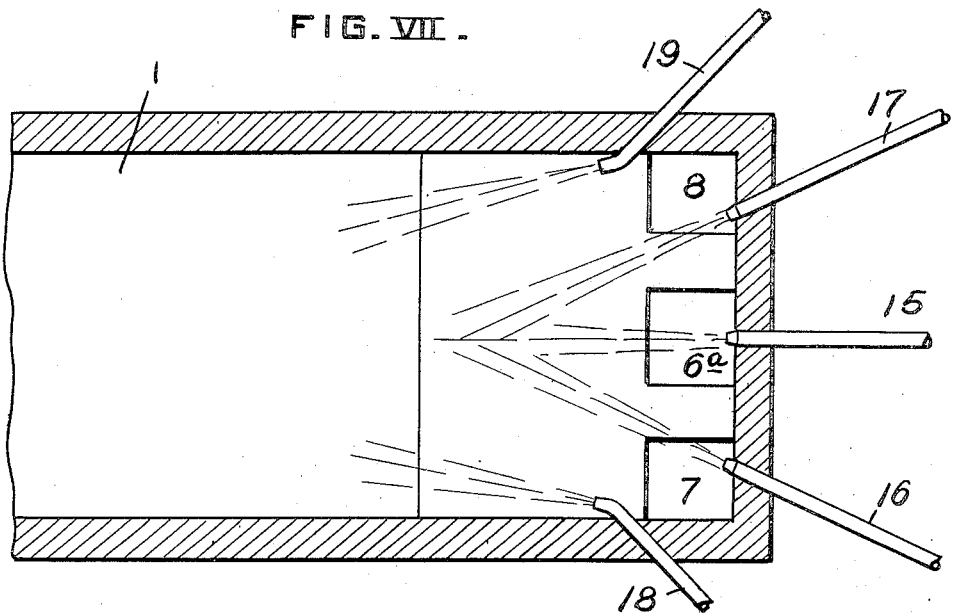

FIG. VIII.
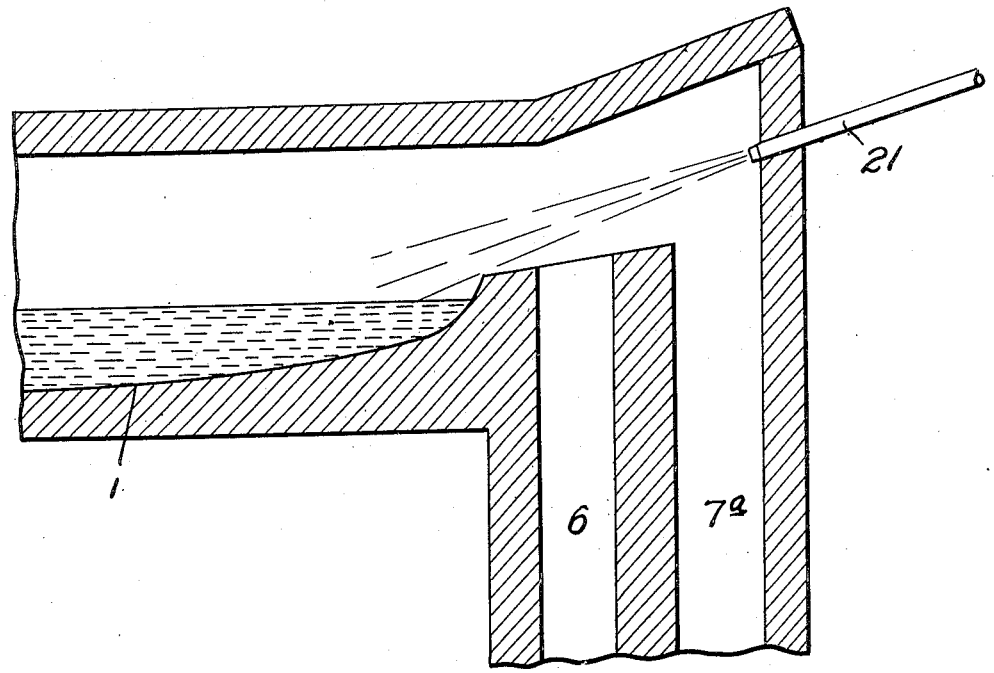
FIG. IX.
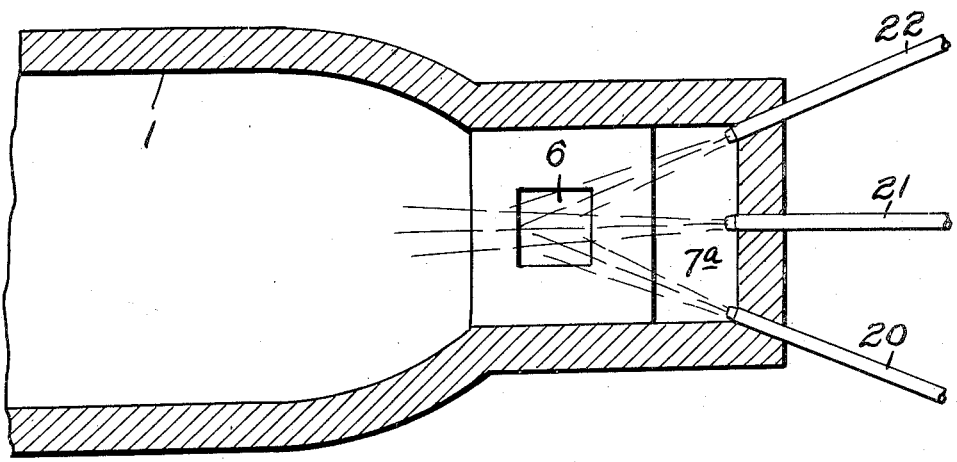

Patented Nov. 4, 1924.

1,513,828

UNITED STATES PATENT OFFICE.

ROBERT B. KERNOHAN, JAMES S. LOCHHEAD, AND WILLIBALD TRINKS, OF PITTS-
BURGH, PENNSYLVANIA.

STRUCTURE AND METHOD OF OPERATION OF HEATING FURNACES.

Application filed January 10, 1922. Serial No. 528,341.

*To all whom it may concern:*

Be it known that we, ROBERT B. KERNO-
HAN, JAMES S. LOCHHEAD, and WILLIBALD
TRINKS, residing at Pittsburgh, in the county
of Allegheny and State of Pennsylvania,
citizens of the United States, have invented
or discovered certain new and useful Im-
provements in Structures and Methods of
Operation of Heating Furnaces, of which im-
provements the following is a specification.

Our invention consists in improvements in
structure and method of operation of heat-
ing furnaces, and specifically in improve-
ments upon the invention set forth in an ap-
plication for Letters Patent of the United
States filed by Willibald Trinks, July 17,
1923, Serial No. 652,061.

As explained in the prior application al-
luded to, our inventive work, although ap-
plicable generally to heating furnaces, has
actually been performed upon the open-
hearth steel furnace; and while we mean
to claim the invention in the full breadth of
its applicability, we shall show and describe
it in application to the open-hearth furnace.

In the accompanying drawings Fig. I is a
view in longitudinal section of an open-
hearth furnace embodying our present in-
vention; Fig. II is a view in approximately
horizontal section of the same structure.
The plane of section of Fig. I is indicated in
Fig. II by the broken line I—I, and that
of Fig. II is indicated by the line II—II,
Fig. I. Fig. III is a view in vertical and
transverse section, on the plane indicated at
III—III, Fig. I. Figs. IV and V are frag-
mentary views, corresponding to Figs. I and
II, and drawn to slightly larger scale, illus-
trating a modification of the invention.
Figs. VI and VII similarly illustrate a sec-
ond modification, and Figs. VIII and IX a
third. Of course, this is not intended to be
an exhaustive showing of possible modifica-
tions.

In our prior application above alluded to
we described and claimed the employment,
in the firing of a furnace, of a jet of fluid,
to induce and accelerate at the intake end
of the furnace the flow toward the furnace
chamber of the constituents of a combustible
mixture (or of one or more of them). Such
acceleration of flow, as we explained, proved
itself to be of peculiar value in regenerative
furnaces, since thus it became possible
through duplicate ports at opposite ends of
the furnace to introduce at one end the com-
ponents of combustion in proper quantities
and under suitable conditions to generate
a flame of best character, and at the other
end to carry away the products of combus-
tion freely. And in that prior application
we described and claimed a jet of fluid of
distinctive character as peculiarly suitable
for the accomplishment of our desired end;
we termed this jet a high-velocity jet, and
defined it to be a jet projected from a con-
vergent-divergent nozzle, having an actual
velocity equalling or even exceeding the
velocity of sound in the propelling medium
—a velocity attainable only by the use of
a nozzle of that character.

Our present invention has to do with the
same subject-matter, that is to say, with the
projection of a jet of fluid into the line of
flow of constituents of a combustible mix-
ture approaching the furnace chamber, but
is primarily concerned not with the rate of
flow but with the direction of flow. We find
(and herein lies our invention) that the
jets projected from properly directed noz-
zles are effective not merely to induce flow
but to define the course in which the fuel
flows and the shape and size and position
as well as the intensity of the flame. The
consequence and effect is that in furnace
building, and particularly in the building
of the furnace ends, walls of masonry
forming partitions and tunnels and sepa-
rate ports may be dispensed with; and in-
stead jets of fluid may be relied upon to
achieve the same ends. The advantage lies
not merely in simplification of structure. A
wall of masonry once built remains rigid; a
jet of fluid may by variation in pressure or
quantity or both be modified in extent and in
the intensity of its influence, and this with-
out alteration of structure once set up, and
furthermore variation in direction may
readily be made, and where a plurality of
jets cooperate to the end in view relative
variation in any of these matters with conse-
quent more complete control of the whole
matter is readily attained. Our invention
then brings into the situation not merely the benefits and advantages dwelt on in our earlier application, but simplification of structure and flexibility in operation, as now for the first time will be fully described. To these matters our present claims will be addressed, for in them lies our present invention.

Referring to Figs. I–III of the drawings, an open-hearth steel furnace of familiar general form is shown. The furnace hearth is indicated at 1; the uptakes 7 and 8 duplicated at opposite ends of the furnace serve, at the intake end, to carry preheated air from regenerator to furnace chamber, and, at the outgoing end, to carry the hot products of combustion from furnace chamber to regenerator.

In this instance the fuel contemplated is a fuel not preheated (or at least a fuel which if at all preheated does not require to be carried through a regenerator). This fuel may be natural gas, oil, tar, coal dust borne on a fluid stream, or a combination of two or more of these etc. The fuel is conveyed, under initial pressure greater or less as the case may be, through a supply pipe 2, to the furnace hearth 1. In the use of certain of the fuels mentioned we find it desirable to introduce the fuel through pipe 2 and steam (or other component) through a pipe 3, and both such components together through a common delivery pipe 4 to the furnace.

The furnace is not provided with the usual ports. Instead, both the air rising through uptakes 7 and 8 and the fuel entering through pipe 4 are in immediate communication through the entrance passageway 5 with the furnace chamber, and the entrance passageway 5 is, it will be observed, in this case widened to the full breadth of the furnace chamber. Whatever control there be of the entering streams of air and of fuel is accomplished by the means and in the manner which constitute our invention.

The delivery pipe 4 is set about with nozzles 9, 10, 11, 12. These nozzles will be understood to be preferably of the convergent-divergent type described in our latest prior application alluded to above, and will be understood to be supplied with suitable fluid (ordinarily air) under suitable pressure. It will be plain, without minute illustration that the supply of fluid to these several nozzles may be from a common source or reservoir or from different sources, and if from different sources, that the pressure or head under which the fluid is supplied may be different upon the different sources; it will further be understood that the volumetric delivery to the nozzles may be varied, either to all in unison, or to one or more as related to the others.

In the arrangement shown in the drawings there are two nozzles, 9 and 10, arranged vertically, one above and one below the fuel delivery pipe 4, and two, 11 and 12, arranged horizontally, on either side the fuel delivery pipe. They are arranged to deliver their jets forwardly, to impinge upon the stream of fuel delivered from pipe 4. Furthermore, they are so arranged that the streams of preheated air rising through uptake passageways 7 and 8 and advancing to the furnace chamber sweep over and submerge them, while their effect is to induce accelerated flow, achieving in that respect the invention of our earlier application alluded to.

The two jets of fluid from nozzles 9 and 10 impinge (cf. Fig. I) at acute angles upon the stream of fuel issuing from pipe 4. Impinging upon the fuel stream, their effect is to flatten that stream, and, carrying as they do induced accelerated streams of flame-nourishing preheated air, their effect is to cause the delivery from the fuel pipe 4 of a horizontally flattened flame, similar in this respect to the flame issuing from a fishtail burner. According as the nozzles 9 and 10 are directed relatively one to the other the resultant flame will be modified; we find it desirable to direct these nozzles at an angle not exceeding 90°. The fish-tail effect will be most pronounced when these two jets are directed in lines at a right angle the one to the other, the effect will diminish as this angle diminishes and as the two lines approach parallelism. By making the nozzles adjustable in this matter of relative angularity of delivery the degree of flattening of the flame may be modified. This flattening of the flame is advantageous because the heating effect is thus controlled and distributed evenly across the width of the hearth, and because combustion is quickened. A shorter sharper flame is produced; and this is a matter of gain and advantage, particularly in regenerative furnaces.

But not only are there upper and lower jets with their horizontally flattening effect, there are jets from the lateral nozzles 11 and 12 also. These serve to keep the flattened and outspread flame within limits laterally, so that the flame shall not strike and erode the front and back walls of the furnace. Ordinarily these lateral jets are less powerful than the vertical ones.

Returning to consideration of the upper and lower jets, turning on of more air to the upper nozzle 9 tends to depress the flame, turning on more air to the lower nozzle tends to raise the flame, turning on more air both above and below tends to make the flame shorter and sharper.

Of course the number and arrangement of the jets may be modified to meet particular conditions, and of course in place of simple nozzles compound nozzles may be employed.

But the principle involved is sufficiently explained and the essential features of structure and operation are sufficiently indicated in the drawings together with the explanation here given.

Again we remark that partition walls and port structures are dispensed with, and the ends are gained in simplified structure and by means wholly under control and variable (as walls of masonry are not) to adapt the furnace to particular or even to changing conditions, or even to the progress of the operation.

The jets by virtue of their high-velocity character, introduce but relatively small quantities of air or other fluid,—quantities so small that even if unheated, they still will be ineffective to disturb the good and effective operation of the furnace.

A jet projected at high velocity entrains and induces flow of the surrounding fluids by viscous drag and forces them to travel in the direction of the jet. The velocity of the jet slows down as more and more of the surrounding fluid is entrained, no matter whether that fluid be air, gas, or vapor such as vaporized oil or tar. The jet has a double action: First, it entrains, accelerates, and gives direction, and, second, it mixes the fluids which are entrained. By experiment we have found that a high velocity jet spreads from the nozzle by entraining the surrounding fluid, making a total cone angle of about 26 degrees, if flowing in a reasonably open space. Within the jet the total momentum remains approximately constant at any cross section along the flow. No matter whether the jet entrains fluid in a duct or whether it does so in a reasonably open space, such as the main chamber of a furnace, the outstanding fact remains that the jet issuing at very high velocity from a high pressure convergent-divergent nozzle, has much more directing and entraining power than a jet which is discharged from a simple convergent nozzle. By virtue of this the use of a high velocity jet becomes possible where the ordinary jet would be a failure, because of too much mass of the entraining fluid.

It will be observed that at the outgoing end of the furnace the passageways 7 and 8 are wide open, to carry away the products of combustion. The pipes and nozzles, to the extent that they may be exposed to the attack of flame may be water-jacketed, or they may be removable, all as explained in our earlier application.

Figs. I–III show a furnace intended for such fuel as natural gas, or other relatively rich fuel not requiring preheating, or at least not preheating in regenerators. Figs. IV and V show the invention applied to a furnace using producer gas and which does involve the use of gas regenerators. Here the preheated air rises as before from regenerator through uptakes 7 and 8, and the preheated gas rises from its regenerator through uptakes 6. Here the approach to the furnace hearth is through a somewhat, but not greatly, narrowed entrance. In the floor of this entrance is formed a central longitudinally extending groove, formed by the laterial blocks 13 and 14 of refractory brickwork, and longitudinally through this groove a stream of gas is induced and impelled by a jet projected by a nozzle 15 set opposite the groove and discharging its jet across and above the uptake 6. This jet 15 confines and directs the gas and causes it to advance in a defined stream through the groove between blocks 13 and 14 to the furnace hearth. No tunnel vault is required. The jet from nozzle 15 dispenses with the necessity of such a vault.

The air rising through uptakes 7 and 8 is accelerated in its flow by jets from nozzles 16 and 17, and all three nozzles cooperate to carry flame-nourishing streams of air forward with and in immediate contact with the streams of gas, to the end that an intense and properly directed flame is projected upon the furnace hearth.

The nozzles 16 and 17 induce air from the uptakes 7 and 8. Some of this induced air is swept along in immediate mingling with the stream of gas. Combustion is started earlier. Furthermore, increased energy is imparted to the stream of gas, and these conditions cooperate to produce a shorter, sharper flame. In addition, and in the development of our present invention, we now (omitting the over-arching tunnel) provide nozzle 15. The jet from nozzle 15 by entraining action imparts velocity to the air above it (in that respect adding to the effect of the jets from nozzles 16 and 17), and it also imparts velocity to the gas below it, and it carries along both streams, giving them the desired direction—a direction which holds the flame down on the bath on the furnace hearth.

Nozzle 15 may if desired be shaped to deliver a flattened jet, or a plurality of nozzles may be arranged side by side horizontally, in place of the single nozzle 15 shown.

The removal of the vault from the gas duct is made possible by the provision of nozzle 15. But for the jet projected from nozzle 15 the gas rising in uptake 6 would ascend to the roof of the structure and the effect of the jets from nozzles 16 and 17 would be the production of a vertically disposed fish-tail flame, and such a flame would be destructive of the masonry of the furnace ends. The jet from nozzle 15 constitutes a "kinetic energy" roof to the stream of gas and to the developing flame. By "kinetic energy roof" we characterize a roof formed of gas—of a material which under other conditions is inconceivable as a material out of which a roof may be formed—which becomes suitable by virtue of its condition, being driven in predetermined path at great velocity, that is to say responsive to the expenditure of large quantities of kinetic energy.

Again, it should be noted that this arrangement of jets directing the streams involves the use of jets which are preferably of "high velocity"—of a velocity approaching or even exceeding the velocity of sound in the propelling medium. If jets 16 and 17 were low-velocity jets the air delivered by them would have to be highly preheated, to prevent the chilling effect of the large quantities of the air which would have to be so introduced to effect the end in view. And if the jet projected from nozzle 15 were a low-velocity jet, there would be, in addition to the problem of temperature, a further dilemma: either combustion would take place at once on the impingement of the jetted air upon the gas (consequent upon the relatively large volumes that would have to be jetted), or else, if the volumes were diminished in order to avoid such an undesirable result, the jet would be ineffective, and the gas would rise to the roof of the structure.

As in the furnace of Figs. I–III the uptakes 6, 7, and 8 are at the outgoing end of the furnace wide open; no obstruction is offered to the outgoing products of combustion.

Almost any arrangement of the gas and air uptakes and of the furnace ends becomes possible, if only the fluid jets are projected with sufficient velocity and at the proper places. Figs. IV and V show, as has been explained, an arrangement in which the gas uptake is somewhat farther distant from the furnace hearth than the air uptakes.

Figs. VI and VII show an arrangement in which the gas uptake 6$^a$ is arranged medially and in transverse line with the air uptakes 7 and 8. In this case again, as in the furnace of Figs. I–III, the approach is through a passageway as wide as the hearth itself. As in the furnace of Figs. IV and V, a nozzle 15 entrains the gas and induces its flow and confines it to a stream flowing over the downwardly inclined floor to the bath upon the furnace hearth, and this jet from the nozzle confines the stream of gas from above. Jets from all three nozzles 15, 16, 17, induce accelerated flow of air and carry combustion-nourishing streams of air along with and overlying the stream of gas. In this case there is danger, lest in consequence of lateral spread the flame will strike the furnace walls. Accordingly auxiliary nozzles 18 and 19 are provided and from them small jets are projected, to keep the flame away from the furnace walls.

Again it is proper to remark that, because of the tremendous kinetic energy of fluid flowing at the velocity of sound, even the multiplicity of jets shown in Figs. VI and VII will, in proper operation, bring in no more non-regenerated air than from 5 to 15% of the total volume of the incoming streams, and that the cooling effect of such relatively small volumes is inconsiderable, even when the air is unheated, in comparison with the gains otherwise achieved.

In the furnace of Figs. VIII and IX, the gas uptake 6 is arranged nearer the hearth and the air uptake, in this case a single uptake 7$^a$ of double the usual capacity, is symmetrically arranged at greater distance. In this case three high-velocity jets from nozzles 20, 21, and 22, are employed, all of which blow across the wide mouth of the air uptake. Nozzle 21 is directed on the mid-line of the furnace and nozzles 20 and 22 are directed convergently toward that mid-line. The induced stream of preheated air thus is swept across the mouth of gas uptake 6, and thus an accelerated stream of gas is induced and carried forward to the furnace hearth, and this stream is overlaid by a stream of combustion-nourishing air.

Here again the approach to the furnace hearth is shown to be somewhat narrowed, but, bringing into consideration Figs. II, V, VII, and IX, we desire to note the fact that in the use of our invention this matter of width of the open furnace end may be suited to and dependent on other conditions. The firing of the furnace may be successfully accomplished, whether this entrance passageway be relatively wide or narrow. And in this particular any of the furnaces shown may be modified to conform to any one of the others.

Speaking generally of the structures now described, the effect of the jets is to force the air and the gas (or other fuel) along the bottom of the furnace end, keeping the flame away from the side walls and the roof. The brick of the bottom can stand the heat of the flame, as those of the side walls and roof cannot, for the bricks of this bottom surface rest on a solid foundation which is not subject to such high temperature conditions, and when softened by heat these bricks will still keep their place. The brickwork in side walls and roof is in different case, and when these bricks are softened by heat there is a running away of surface material and soon the structure is unserviceable.

Our present invention is particularly valuable in open-hearth furnaces, because it permits of the use of wide open furnace ends, into which (at the outgoing end—the furnace being in operation) the waste gases enter and pass out at low velocity. Those skilled in the art will understand that under such conditions of operation there will be little or no carrying over into the regenerators of ferrous oxide and slag, with the consequence that the life of the furnace will be relatively long.

By high-velocity jet as we use it in this specification we mean a jet which is delivered at approximately the velocity at which sound travels in the impelling medium, or even at higher velocity. This is attainable only by the use of a convergent-divergent nozzle, that is a nozzle of De Laval type.

We have sufficiently indicated that in the practice of our invention much latitude is permissible both in details of structure and in details of operation.

We claim as our invention:

1. In the operation of a regenerative furnace the method of firing herein described which consists in introducing into a chamber supplied with regenerated air and opening to the furnace hearth a stream of gaseous fuel, and in introducing also into the said chamber a directing and guiding jet of gaseous fluid at a velocity exceeding that of sound.

2. In the operation of a regenerative furnace the method of firing herein described which consists in introducing into a chamber supplied with regenerated air and opening to the furnace hearth a stream of gaseous fuel, and in directing and guiding the resultant flame by causing a gaseous jet of a velocity exceeding that of sound to impinge upon the fuel stream.

3. In the operation of a regenerative furnace the method of firing herein described which consists in introducing into a chamber supplied with regenerated air and opening to the furnace hearth a stream of gaseous fuel, and in directing and guiding the resultant flame by and between convergently directed gaseous jets.

4. In the operation of a regenerative furnace the method of firing herein described which consists in introducing into a chamber supplied with regenerated air and opening to the furnace hearth a stream of gaseous fuel, directing and guiding the resultant flame by and between convergently directed gaseous jets, and varying the angle of convergence of such jets.

5. In the firing of a regenerative furnace which includes in its structure an uptake passageway for preheated gas, the method herein described of protecting the roof of the structure from the destructive action of flame which consists in projecting transversely above the gas uptake passageway and in the direction of the furnace hearth a gaseous jet at a velocity exceeding that of sound.

6. In the firing of a furnace the method herein described of directing the flame which consists in projecting upon the advancing stream of fuel in the region of combustion a directing and guiding gaseous jet, and in projecting upon the edges of the stream outspread by the jet already mentioned limiting gaseous jets.

7. In the firing of a furnace the method herein described of directing and controlling the flame which consists in projecting upon the advancing stream of fluid in the region of combustion a gaseous jet of a velocity exceeding that of sound, and varying the intensity of such jet according to the changing conditions within the furnace.

8. In the firing of a furnace the method herein described which consists in subjecting the stream of fuel in the region of combustion to the directing influence of a plurality of gaseous jets of a velocity exceeding that of sound, impinging upon the stream at successive points in the line of flow.

9. In the firing of a furnace the method herein described which consists in causing fluid substance for combustion to approach the furnace chamber under the acceleration of a gaseous jet of a velocity exceeding that of sound, and in directing and guiding the flame by causing another jet of fluid to impinge upon the stream in the region of combustion.

10. The method herein described of operating a regenerative furnace which consists in accelerating the flow of lateral streams of pre-heated air, and directing away from the furnace walls the flame due to the combustion of a medial stream of fuel, by projecting gaseous jets at a velocity exceeding that of sound upon the fuel stream on either side in a space freely supplied with air.

11. In a regenerative furnace provided at the intake end with lateral conduits for preheated air and a central conduit for fuel all opening to a common passageway which in turn opens to the furnace chamber, the method of operation herein described which consists in projecting gaseous jets at a velocity exceeding that of sound forwardly toward the furnace chamber at the point where the several streams entering the said common passageway meet, whereby flow is accelerated, the streams are confined and directed, and combustion intensified.

12. In a furnace including in its structure an entrance passageway for the components of combustion leading to the furnace chamber, three conduits opening to the passageway first named at the end remote from the furnace chamber, the central conduit of the three being adapted to carry one component of a combustible mixture and the two lateral conduits being adapted to carry another component, together with means for inducing low-pressure flow from conduits through passageway to and through furnace chamber, the method herein described of accelerating flow and intensifying combustion which consists in projecting within the passageway between the confluent streams and at the point where the entering components meet, a forwardly directed gaseous jet, at a velocity exceeding that of sound.

13. In a furnace using preheated air for combustion the method of operation herein described which consists in projecting convergent gaseous jets at velocities exceeding that of sound toward the furnace chamber, and supplying one component of a combustible gaseous mixture to the space between the jets and supplying another component of the mixture to the space around the group of jets.

14. In a regenerative furnace the combination with the furnace hearth of a chamber opening to said hearth, means for supplying regenerated air to said chamber, means for introducing a stream of gaseous fuel to said chamber, and a nozzle of De Laval type supplied with gaseous fluid under pressure and arranged to deliver its jet within said chamber.

15. In a regenerative furnace the combination with the furnace hearth of a chamber opening to said hearth, means for supplying regenerated air to said chamber, means for introducing a stream of gaseous fuel to said chamber, and means for directing a gaseous jet of a velocity exceeding that of sound upon the stream advancing from the fuel-introducing means through the said chamber.

16. In a regenerative furnace the combination with the furnace hearth of a chamber opening to said hearth, means for supplying regenerated air to said chamber, means for introducing a stream of gaseous fuel to said chamber, and means for directing upon the stream advancing from the fuel-introducing means and through the chamber opposite convergent gaseous jets.

17. In a regenerative furnace the combination with the furnace hearth of a chamber opening to said hearth, means for supplying regenerated air to said chamber, means for introducing a stream of gaseous fuel to said chamber, means for directing upon the stream advancing from the fuel introducing means and through the chamber opposite convergent gaseous jets, and means for varying the angle of convergence of the said jets.

18. In a regenerative furnace including in its structure an uptake passageway for preheated gas, the combination with such uptake passageway of a nozzle of a De Laval type supplied with gaseous fluid under pressure and directed transversely above said uptake passageway and toward the furnace hearth.

19. In a furnace structure the combination with a furnace chamber of means for causing a burning mixture of gases to enter and advance through said chamber, means for directing upon the advancing stream a gaseous jet, and means for directing upon the edges of the stream outspread beneath the jet already mentioned limiting gaseous jets.

20. In a regenerative furnace structure the combination with a furnace chamber of a chamber supplied with regenerated air opening to said furnace chamber, means for causing a stream of fuel to enter said air-supplied chamber, a nozzle of De Laval type supplied with gaseous fluid under pressure directed upon the course of advance of fuel within said air-supplied chamber, and means for varying the supply of fluid to said nozzle.

21. In a regenerative furnace structure the combination with a furnace chamber of a chamber supplied with regenerated air opening to said furnace chamber, means for causing a stream of fuel to enter said air-supplied chamber, and a plurality of nozzles of De Laval type supplied with gaseous fluid under pressure directed upon the course of advance of fuel within said air-supplied chamber and at successive points in the course of such advance.

22. In a regenerative furnace structure the combination with a furnace chamber of a chamber supplied with regenerated air and opening to said furnace chamber, means for carrying a stream of fuel to said air-supplied chamber, a nozzle of De Laval type supplied with gaseous fluid under pressure arranged to direct a flow-impelling jet upon fuel advancing from said carrying means to said air-supplied chamber, and means for causing a second jet of fluid to impinge upon the stream at a point farther on and within said air-supplied chamber.

23. A regenerative furnace including in its structure a furnace chamber and a medial fuel passageway and lateral air passageways leading to said chamber, nozzles of De Laval type supplied with gaseous fluid under pressure and arranged to deliver their jets at either side upon the stream of fuel and within a space freely supplied with air.

24. In a regenerative furnace the combination with a furnace chamber provided at the intake end with lateral conduits for preheated air and a central conduit for fuel, all opening to a common passageway which in turn opens to the furnace chamber, of nozzles of De Laval type supplied with gaseous fluid under pressure and arranged within the structure and directed forwardly at the point where the several streams entering the said common passageway meet.

25. A furnace including in its structure a chamber, an entrance passageway for the components of combustion leading to the furnace chamber, three conduits opening to the passageway first named at the end remote from the furnace chamber, the central conduit of the three being adapted to carry one component of a combustible mixture and the two lateral conduits being adapted to carry another component, means for inducing low-pressure flow from conduits through passageway to and through furnace chamber, and nozzles of De Laval type supplied with gaseous fluid under pressure arranged at the points where the component streams of fuel and air meet and directed forwardly.

26. In a furnace using preheated air for combustion, a furnace chamber, a plurality of nozzles of De Laval type supplied with gaseous fluid under pressure arranged to deliver convergent jets in direction toward the furnace chamber, means for supplying one component of a combustible gaseous mixture to the space between the jets, and means for supplying the other component of the mixture to the space around the group of jets.

27. In a regenerative furnace the combination with the furnace hearth of duplicate passageways at either end for ingress of a flaming mixture and for egress of the products of combustion and duplicate sets of uptakes at either end including gas uptake and air uptakes, symmetrically arranged with respect to the mid-line of the furnace, means for causing the stream of gas from the gas uptake as it approaches the furnace hearth to flow upon the floor of the passageway overlaid with a stream of combustion-nourishing air from the air uptake, such means consisting of a nozzle of De Laval type supplied with gaseous fluid under pressure arranged to project its jet at an interval above the gas uptake.

28. In a regenerative furnace the combination of a furnace hearth, an entrance passageway supplied with air leading thereto, a groove formed longitudinally in the floor of said passageway, a gas uptake arranged at the end of the passageway remote from the hearth and aligned with said groove, and a nozzle adapted to deliver a jet of gaseous fluid under pressure transversely above said uptake and longitudinally above said groove.

29. In a regenerative furnace the combination of a furnace hearth, an entrance passageway supplied with air leading thereto, a gas uptake arranged at the end of said passageway remote from the hearth, and a nozzle of De Laval type supplied with gaseous fluid under pressure arranged to deliver its jet transversely above said uptake and longitudinally through said passageway and at an interval beneath the roof of said passageway and toward the furnace hearth.

In testimony whereof, we have hereunto set our hands.

ROBERT B. KERNOHAN.
JAMES S. LOCHHEAD.
WILLIBALD TRINKS.

Witnesses:
GEO. J. SEITZINGER,
DENNIS J. DORAN.